R. P. NOBLE.
STEERING DEVICE FOR BICYCLES.
APPLICATION FILED DEC. 7, 1909.
973,806.
Patented Oct. 25, 1910.
2 SHEETS—SHEET 1.
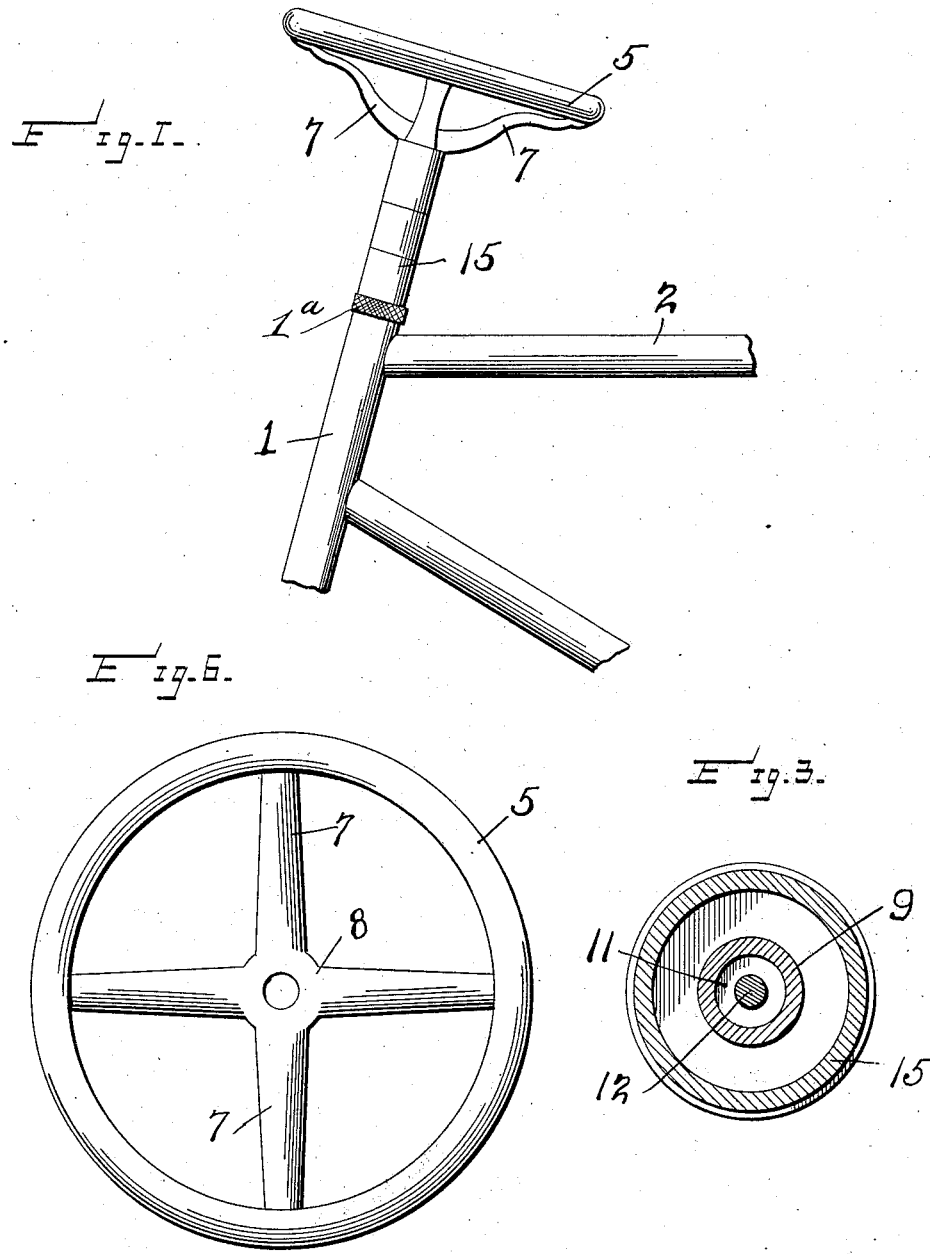

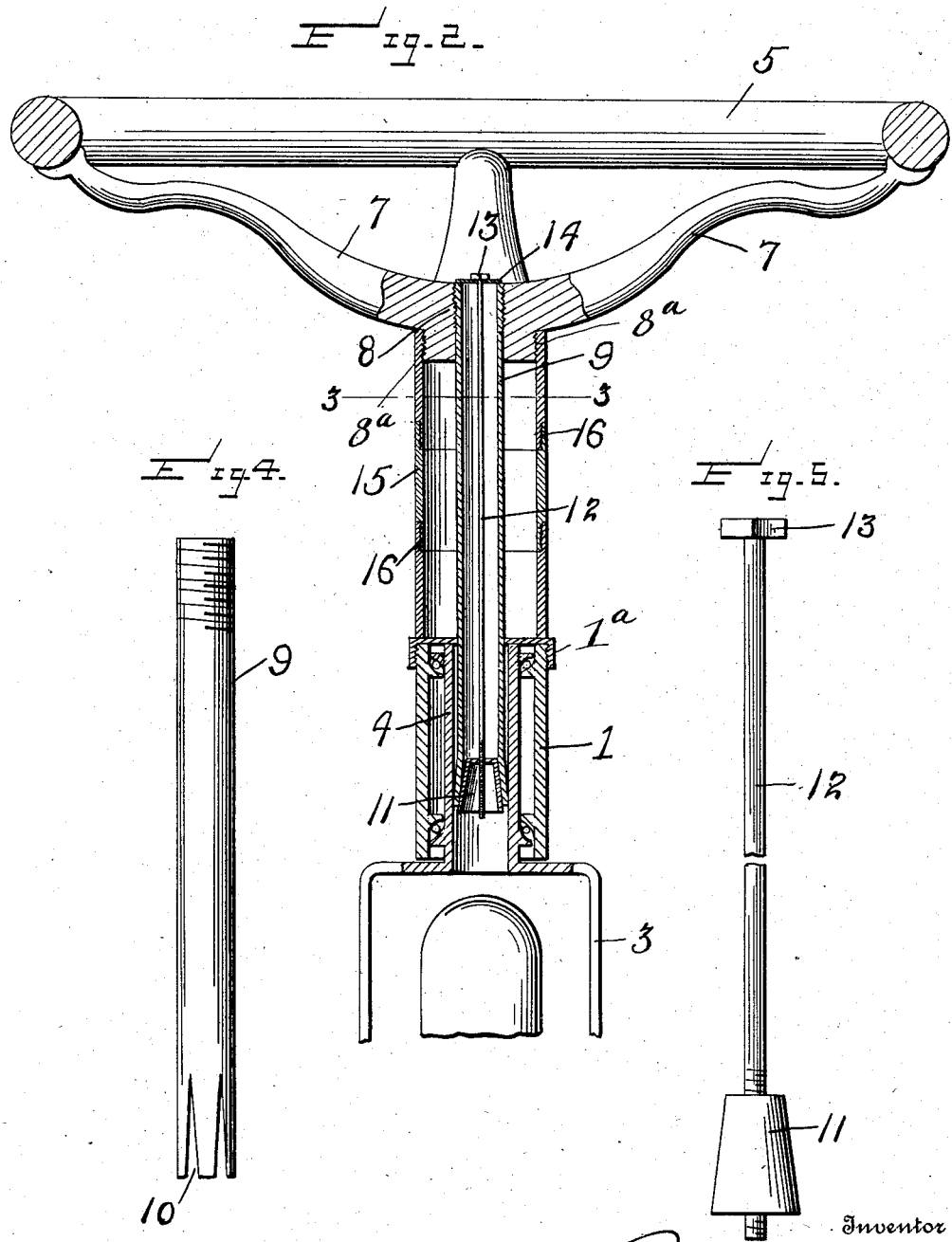

UNITED STATES PATENT OFFICE.

ROBERT PRIMROSE NOBLE, OF SMITHFIELD, NORTH CAROLINA.

STEERING DEVICE FOR BICYCLES.

973,806.  Specification of Letters Patent.  Patented Oct. 25, 1910.

Application filed December 7, 1909. Serial No. 531,836.

*To all whom it may concern:*

Be it known that I, ROBERT P. NOBLE, a citizen of the United States, residing at Smithfield, in the county of Johnston and State of North Carolina, have invented certain new and useful Improvements in Steering Devices for Bicycles, of which the following is a specification, reference being had to the accompanying drawings.

This invention relates to improvements in steering devices for bicycles, motor-cycles and the like, and more particularly to a steering wheel which may replace the ordinary handle bar, and which has improved means for adjustably mounting and supporting it.

The object of the invention is to provide a simple and practical steering hand wheel which may be readily applied to ordinary bicycles and the like, and which may be adjusted vertically to bring the steering wheel at any desired elevation to suit the convenience and comfort of the rider.

With the above and other objects in view, the invention consists of the novel construction, combination and arrangement of parts, hereinafter fully described and claimed and illustrated in the accompanying drawings in which:—

Figure 1 is a side elevation of my improved steering wheel showing it applied, a portion only of the bicycle being shown. Fig. 2 is an enlarged vertical section; Fig. 3 is a detail cross section taken on the plane indicated by the line 3—3 in Fig. 2; Fig. 4 is a detail view of a steering or handle tube; Fig. 5 is a detail view of the clamping rod and the wedge-shaped or cone nut, and Fig. 6 is a plan view of the steering wheel.

Referring more particularly to the drawings 1 denotes the front or upright tubular member of the frame 2 of a bicycle, motor-cycle or the like, 3 denotes the front wheel fork and 4 the forked tube which extends through and is rotatable in bearings in the tube 1.

5 denotes a steering hand wheel which may be of any suitable form and construction but which preferably consists of a circular rim made of wood or other material and in one or more sections, and secured to a frame consisting of curved arms 7 radiating from a central hub 8. The opening in the latter is internally screw threaded for the reception of the correspondingly threaded upper end of a steering or handle tube 9, the lower end of which extends into the forked tube 4 and is adapted to be rigidly secured therein. This connection is preferably effected by forming the lower extremity of the tube 9 with longitudinal slits 10 so that the tongues or portions between such slits may be spread outwardly into firm frictional engagement with the inner wall of the tube 4. The split portions or tongues may be thus spread or expanded by a cone-shaped nut 11 arranged on the threaded lower end of a tightening or clamping rod 12 which extends through the tube 9 and has on its projecting upper extremity a head 13 beneath which is arranged a washer 14, the latter bearing upon the upper end of the tube 9 and closing the bore or opening in the same. It will be seen that owing to this manner of fastening the handle tube 9 in the forked tube 4, said handle tube may be telescoped to a greater or less extent in the tube 4 to dispose the hand wheel 5 at different elevations according to the convenience and comfort of the rider.

15 denotes a covering tube which surrounds the tube 9 between the hub 8 of the hand wheel and the upper portion of the bicycle frame. This covering tube is provided to brace the tube 9 and also to render the connection more attractive, it being understood that the tube 15 may be finished or ornamented according to the design of the bicycle. Said tube 15 is adapted to be adjusted in length according to the vertical adjustment of the tube 9, and to permit of this it is composed of a plurality of short tubular sections which have screw threaded engagement with each other as indicated at 16. The uppermost section of the tube 15 is internally screw threaded to receive the externally screw threaded lower end $8^a$ of the hub of the hand wheel so that the tube 15 rotates with the hand wheel and tube 9. The lowermost section of the tube 15 bears and turns upon a screw cap $1^a$ arranged on the upper extremity of the tube 1, as clearly shown in Fig. 2. It will be seen that by increasing or decreasing the number of the sections in the tube 15 the latter may be made of any length according to the adjustment of the hand wheel, and that by uniting it to the hand wheel and having it engage and rotate upon the cap $1^a$ the tube 9 will be materially strengthened and supported and the front portion of the bicycle will be rendered more attractive in appearance.

From the foregoing it will be seen that my invention provides a steering wheel which may be readily applied to a bicycle or the like in place of the ordinary handle bars, and that it will enable the rider to sit in an erect position and have his hands rest comfortably on the hand wheel. By means of the wheel the bicycle may be steered as readily with one hand as with two, and the arms and body of the rider can be rested by changing his hands to different positions on the wheel. The peculiar construction of the connection which unites the wheels to the bicycle permits the wheel to be readily positioned at any elevation which will suit the rider.

Having thus described the invention what is claimed is:

1. The combination with the frame of a cycle having a front upright tube and a rotatably mounted steering tube in the latter, of a hand wheel, a handle tube having said hand wheel fixed to its upper end, and its lower end telescopically arranged in and adjustably clamped to said steering tube, and a surrounding tube composed of a plurality of detachably connected sections, the uppermost section being connected to the hand wheel, and the lowermost section terminating adjacent the upper extremity of said upright front tube of the cycle frame.

2. The combination with the frame of a cycle having a front upright tube, a cap upon the top of the latter and a rotatable steering tube in said upright tube, of a hand wheel having a hub provided with an internally threaded bore and an externally threaded lower end, a handle tube screwed into the bore of said hub and having its lower end telescopically arranged in said steering tube, a clamping means for adjustably securing the lower end of the handle tube in said steering tube, and a surrounding tube composed of a plurality of detachably connected sections having screw threaded engagement with each other, the uppermost section of said surrounding tube being internally screw threaded to engage the external screw threads on the hub of the hand wheel, and the lowermost section of said surrounding tube bearing upon the cap at the top of the front upright tube of the cycle frame, substantially as shown and described.

In testimony whereof I hereunto affix my signature in the presence of two witnesses.

ROBERT PRIMROSE NOBLE.

Witnesses:
  C. V. JOHNSON,
  A. M. NOBLE.